Patented Aug. 24, 1954

2,687,388

UNITED STATES PATENT OFFICE 2,687,388

PHENYL METHYL SILOXANE SOLUTION CONTAINING A ZIRCONIUM SALT

Herbert W. McNulty, Baltimore, Md., and Dennis J. Killian, New York, N. Y., assignors, by mesne assignments, to National Distillers Products Corporation, New York, N. Y., a corporation of Virginia No Drawing. Application November 13, 1950, Serial No. 195,488

2 Claims. (Cl. 260—18)

The present invention relates to polyorganosiloxane resins, or plastics, and provides an improved plastic material of that type especially applicable to the forming on solid surfaces of films or coatings of optimum hardness and flexibility. The invention also provides an improved method by which these polyorganosiloxane resins may, with advantage, be produced and further provides improved liquid solutions of organosilicols, i. e., hydrocarbon-substituted silicols, or partially condensed organosilicols from which the polyorganosiloxane resinous finishes or resinous coatings may be readily produced, but which have exceptional stability under normal temperature conditions.

Polyorganosiloxane resins of the type to which the present invention relates are composed primarily, at least, of a plurality of hydrocarbon-substituted silicon atoms linked together by oxygen atoms. These plastic materials may be formed by hydrolysis of organosilicon halides, or organosilicon alkoxides, or mixtures thereof, followed by condensation of the resultant silicols. Such organosilicon compounds commercially useful in the production of polyorganosiloxane resins generally contain an average of more than one and less than two hydrocarbon radicals per silicon atom. It is recognized that the hydrolysis of organosilicon halides and of organosilicon alkoxides is generally accompanied by a greater or less degree of condensation of the resultant silicols to form a liquid mixture containing organosiloxane polymers, the extent of the condensation depending upon the hydrolysis conditions and the nature of the resulting silicols. It will be understood that the term organosilicols, as used herein is not restricted to monomeric silicols, but may also include liquid mixtures containing siloxanes formed by such partial condensation.

These silicols, or partially condensed silicols, may be converted to a relatively hard, insoluble state by heating for comparatively long periods at elevated temperatures. The time and temperature conditions required to cure these liquid organosilicol mixtures to a hard, resinous material has materially detracted from the utility of the organosilicols for such purposes.

It has heretofore been proposed to add to the liquid organosilicol mixtures, resulting from the hydrolysis of these organosilanes, certain metal salts of organic acids, which are soluble therein, to accelerate the curing or hardening of the organosilicols to form the polyorganosiloxane resins. The most satisfactory accelerator, or hardening agent, heretofore discovered for that purpose is lead naphthenate. Though lead naphthenate may be used with considerable success and its use results in polyorganosiloxane resins of exceptional hardness, films of the resin have been found to be extremely brittle.

Further, it is desirable to market organosilicol solutions admixed with the hardening agent so that they can be readily used as desired. A further disadvantage of the use of lead naphthenate as the hardening agent is the instability of the resultant solution at room temperatures, by reason of which gellation of the solution occurs relatively rapidly in storage.

Various other salts have been proposed as hardening agents for this purpose, but, those which have been found to result in solutions having reasonably satisfactory "shelf" stability, are not effective to produce resinous coatings of adequate hardness.

We have discovered that polyorganosiloxane resins, which may be formed into films of a hardness at least equal to that of those formed by the use of lead naphthenate but which are free from the objectionable brittleness of the films formed when lead naphthenate is used, may be prepared by using as the hardening agent a zirconium salt of an organic acid, which is soluble in the silicols.

We have further found that where such zirconium salts are used as the accelerator, or hardening agent, the resultant solutions of the zirconium salts and the organosilicols are exceptionally stable under temperature conditions normally encountered in transportation and storage and have a long storage or "shelf life" before gellation of the solution occurs.

Predicated upon these discoveries, our present invention resides in the use as the hardening agent in the production of polyorganosiloxane resins from organosilicols, a zirconium salt of an organic acid which is soluble in the organosilicol. We have found zirconium naphthenate particularly effective for this purpose. However, other zirconium, or zirconyl salts of organic acids soluble in the organosilicols may be used, for instance, zirconyl stearate, zirconium 2-ethyl hexoate, zirconyl 2-ethyl hexoate, and zirconium salts of organic acids in which the acid is a mixture of naphthenic acid and 2-ethyl hexoic acid, or of stearic acid and 2-ethyl hexoic acid. Among other hardening agents which may be used in accordance with my invention are the zirconium resinates, linoleates and oleates.

The proportions of the zirconium salts used in accordance with our present invention may be varied over a considerable range, extending from as low as about 0.005% up to about 0.5%, the optimum proportion depending upon the composition of the particular organosilicol used, the desired ultimate hardness of the resin film and the temperature and length of the baking period anticipated. It is conceivable that, under some conditions, proportions even without this range may be found useful and the present invention contemplates the use of these zirconium salts in any proportion effective to promote the curing or hardening of the organosilicols. It will be understood that, in accordance with custom in the paint industry, the percentage figures given herein referred to the proportions of zirconium cation, as distinguished from the proportion of the entire zirconium salt, and are based on the weight of the organosilicol exclusive of solvents which might be used.

Proportions of the hardening agent within the range of 0.03% to 0.3% have been found particularly advantageous under usual conditions. In determining the proportions of the hardening agent to be used, the required shelf stability of the solution is an important consideration. We have found, however, that solution of organosilicols containing as much as 0.3% zirconium, as zirconium naphthenate, may be stored for at least six months under room temperature conditions without gellation of the solution. In using concentrations up to 0.3% of zirconium, the resultant resin films have shown no brittleness.

The invention will be further described and illustrated by the following specific examples.

*Example I*

The organosilicol constituent used in this operation was prepared by the hydrolysis and partial condensation of a mixture of phenyl trichlorosilane, dimethyl dichlorosilane and methyl trichlorosilane in proportions of 3:3:1, respectively. To separate portions of a 60% solution of the resultant silicol mixture in xylol, there were added the respective proportions of zirconium naphthenate indicated in the following tabulation in solution in mineral spirits, plus sufficient xylol and a small proportion of butanol to make a 50% solution. The resultant respective solutions were applied to steel and glass panels using a "draw-down" gauge with a clearance of 0.005 inch. The panels were then baked at 400° F. and tested for color, adhesion, flexibility and hardness at the end of a four hour baking period and again at the end of a 24 hour baking period. The shelf stability, i. e., time before gellation at room temperature, hardness and flexibility are also set forth in the following tabulation:

| Sample | 1 | 2 | 3 | 4 | 5 | 6 |
|---|---|---|---|---|---|---|
| Concentration | .03 | .05 | .07 | .1 | .2 | .3. |
| Shelf Stability | (¹) | (¹) | (¹) | (¹) | (¹) | (¹). |
| Hardness: | | | | | | |
| after 4 hour bake | 11.4 | 14.0 | 21.8 | 22.4 | 23.1 | 22.4. |
| after 24 hour bake | 23.2 | 21.8 | 25.4 | 24.3 | 25.0 | 25.0. |
| Flexibility: | | | | | | |
| after 4 hour bake | OK | OK | OK | OK | OK | OK. |
| after 24 hour bake | OK | OK | OK | OK | OK | ¼″ Peel. |

¹ Stable for over six months.

In the foregoing tests, flexibility was determined by the Zuhr mandrel, in accordance with the procedure prescribed by the American Society for Testing Materials, designated "Standard test method for elongation of attached lacquer coatings with the conical mandrel test's apparatus." Hardness was determined by the Sward rocker as described in "Physical and Chemical Examination of Paints, Varnishes, Lacquers, Colors" by Gardner, 7th ed., page 296. In similar tests in which lead naphthenate was substituted for the zirconium salt, the shelf stability of the solution containing 0.03% of lead, as lead naphthenate, was only three days while that of the solution containing 0.3% of lead, as lead naphthenate, was only one day.

*Example II*

In another series of operations there were mixed with separate portions of the organosilicol mixture used in Example I, 0.3% of zirconium, as zirconium naphthenate, and 0.3% of zirconium, as zirconyl stearate, respectively, the respective solutions being applied to panels and baked and tested as in Example I. The results of the tests of these samples are set forth in the following tabulation:

| Sample | 7 | 8 |
|---|---|---|
| Shelf Stability | OK | OK. |
| Hardness: | | |
| after 4 hour bake | 23.3 | 20.3. |
| after 24 hour bake | 23.0 | 20.8. |
| Flexibility: | | |
| after 4 hour bake | OK | OK. |
| after 24 hour bake | Slight break | OK. |

The hardening agent used in sample 7 was zirconium naphthenate and that used in sample 8 was zirconyl stearate. In each of the tests of Examples I and II, the samples showed no signs of tackiness, either at the end of the 4 hour bake, or at the end of the 24 hour bake.

While in the foregoing tests, a mixture of organosilicols was used as the organosilicol constituent, it will be understood that in place of the mixture, a single organosilicol may be used where available. Further, in place of the xylol used as the solvent in these tests, other solvents for the organosilicol constituent may be employed, in various proportions.

In accordance with our present invention, the organosilicols may be prepared by conventional procedure and the polyorganosiloxane resins also prepared therefrom by conventional procedure except that zirconium salt of the type herein described, or mixtures thereof, is used instead of conventional hardening agents.

*Example III*

In a further operation, in accordance with the invention, 60 grams of a viscous liquid organosilicol mixture prepared by the hydrolysis of a mixture of di- and trichlorosilanes, as used in Example I, was mixed with 40 grams of xylol. To the resultant solution, there was added 2.1 grams of a solution of zirconium naphthenate in mineral spirits containing 5.6 grams of zirconium per 100 grams of solution, the proportion of zirconium in the resultant silicol solution being approximately 0.2%. A film of this silicol solution was flowed onto a steel panel and cured by baking in an oven for 1 hour at 400° F. The resultant film of polyorganosiloxane resin was found to adhere strongly to the panel and to be exceptionally hard and tough.

Example IV 10 grams of a viscous liquid organosilicol mixture, prepared by the cohydrolysis of di- and trichlorosilanes, as used in Example I, with silicon tetrachloride was mixed with 10 grams of xylol. To the resultant solution there was added 0.2% of zirconium, as zirconium naphthenate. This solution was then flowed onto steel and glass panels and cured by heating to a temperature of 200° C. for periods of 1, 2, and 4 hours, respectively. At the end of each of the baking periods, one of the samples was examined and, in each instance, the resultant polyorganosiloxane resin film was found to be of good color, to be hard and to have excellent adhesion and flexibility.

We claim:

1. A liquid solution stable at normal temperatures consisting essentially of a heat-hardenable, aromatic-hydrocarbon solvent-soluble, phenylmethyl siloxane resin comprising copolymerized monophenyl siloxane units, dimethyl siloxane units and monomethyl siloxane units dissolved in a volatile solvent and containing as a hardening agent a zirconium salt from the class consisting of zirconium naphthenate and zirconyl stearate in a proportion within the range equivalent to 0.005% to 0.5% of zirconium by weight.

2. The composition of claim 1 in which the zirconium salt is present in a proportion within the range equivalent to 0.03% to 0.3% of zirconium by weight.

References Cited in the file of this patent

UNITED STATES PATENTS

| Number | Name | Date |
|---|---|---|
| 2,449,572 | Welsh | Sept. 21, 1948 |
| 2,453,562 | Wright | Nov. 9, 1948 |

OTHER REFERENCES

Patterson, American Ink Maker, April 1948, volume 26, pages 26, 27, 28 and 55.